(12) United States Patent
Kim et al.

(10) Patent No.: US 8,131,109 B2
(45) Date of Patent: Mar. 6, 2012

(54) IMAGE PROCESSING METHOD AND APPARATUS FOR CONTRAST ENHANCEMENT USING INTENSITY MAPPING

(75) Inventors: Sung-hee Kim, Seoul (KR); Seung-joon Yang, Seoul (KR); Rae-hong Park, Seoul (KR); Bo-ra Lim, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 1288 days.

(21) Appl. No.: 11/760,852

(22) Filed: Jun. 11, 2007

(65) Prior Publication Data

US 2007/0286523 A1 Dec. 13, 2007

(30) Foreign Application Priority Data

Jun. 9, 2006 (KR) .................. 10-2006-0051984

(51) Int. Cl.
   *G06K 9/36* (2006.01)
(52) U.S. Cl. ........ 382/274; 382/168; 382/254; 382/276; 382/282; 348/222.1; 348/239; 348/578; 345/426; 345/589
(58) Field of Classification Search .................. None
   See application file for complete search history.

(56) References Cited

U.S. PATENT DOCUMENTS

| | | | | |
|---|---|---|---|---|
| 5,467,404 A | * | 11/1995 | Vuylsteke et al. | 382/274 |
| 5,828,793 A | * | 10/1998 | Mann | 382/284 |
| 5,982,926 A | * | 11/1999 | Kuo et al. | 382/167 |
| 7,349,574 B1 | * | 3/2008 | Sodini et al. | 382/168 |
| 7,616,233 B2 | * | 11/2009 | Steinberg et al. | 348/222.1 |
| 2004/0218830 A1 | * | 11/2004 | Kang et al. | 382/274 |
| 2005/0013501 A1 | * | 1/2005 | Kang et al. | 382/254 |
| 2005/0104974 A1 | * | 5/2005 | Watanabe et al. | 348/222.1 |
| 2005/0243177 A1 | * | 11/2005 | Kang et al. | 348/207.1 |
| 2006/0082689 A1 | * | 4/2006 | Moldvai | 348/678 |
| 2006/0177150 A1 | * | 8/2006 | Uyttendaele et al. | 382/284 |
| 2007/0092137 A1 | * | 4/2007 | Zhao et al. | 382/169 |
| 2007/0104384 A1 | * | 5/2007 | Shaw | 382/254 |
| 2007/0269132 A1 | * | 11/2007 | Duan et al. | 382/274 |

FOREIGN PATENT DOCUMENTS

JP 9-331486 A 12/1997

OTHER PUBLICATIONS

Bennett et al., "Video Enhancement Using Per-Pixel Virtual Exposures", 2005, ACM, pp. 845-852.*
Grossberg et al., "Determining the camera response from images: What is knowable?", Nov. 2003, IEEE Trans. Pattern Anal. Machine Intell., vol. 24, No. 11, pp. 1455-1467.*

(Continued)

*Primary Examiner* — Sath V Perungavoor
*Assistant Examiner* — Jason Heidemann
(74) *Attorney, Agent, or Firm* — Sughrue Mion, PLLC

(57) ABSTRACT

Provided are an image processing method and apparatus for enhancing contrast. The image processing apparatus includes a determination unit that determines whether contrast enhancement processing should be performed on an input image; an intensity mapping unit that generates a plurality of images having different exposure times from the input image, using intensity mapping, if the contrast enhancement processing should be performed on the input image; and an image composition unit that composes the plurality of images into a composed image. Therefore, it is possible to reduce a color change or a false contour phenomenon that are generated in a related art contrast enhancement process.

20 Claims, 11 Drawing Sheets

OTHER PUBLICATIONS

Robertson et al. Dynamic Range Improvement through Multiple Exposures, 1999, IEEE ICIP 99. vol. 3, p. 159-163.*

Chinese Office Action, dated Sep. 27, 2008, issued in Application No. 2007101464304.

* cited by examiner

IMAGE PROCESSING METHOD AND APPARATUS FOR CONTRAST ENHANCEMENT USING INTENSITY MAPPING

CROSS-REFERENCE TO RELATED PATENT APPLICATION

This application claims the benefit of Korean Patent Application No. 10-2006-0051984, filed on Jun. 9, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to image processing, and more particularly, to image processing for contrast enhancement.

2. Description of the Related Art

The real world has a wide, dynamic range of brightness. However, since display apparatuses for representing the real world have a limitation in the number of bits capable of being displayed, they may not represent the entire wide, dynamic range.

Also, when an image is obtained, if distortion is generated due to a conflict between the characteristics of several devices, the contrast of the image is reduced. In order to mitigate this problem, contrast enhancement (CE) is used.

Related art CE methods include histogram equalization (HE) and gamma correction. The HE method enhances a contrast using a probability density function (pdf) of an image as a mapping function, when an image having a low contrast exists due to an imbalance in a brightness distribution of pixels.

However, when the HE method is used, the effect or direction of lighting in an image can be cancelled or a false contour can be generated by sharply changing an area where pixels gradually change (for example, shadows). Also, if the CE method is performed only on a brightness Y, the corresponding original color can vary when the brightness Y is converted into a color.

The gamma correction method can enhance a contrast using a gamma function as a mapping function when an image having a low contrast exists due to an imbalance in a brightness distribution of pixels. However, when the CE method is performed based on gamma correction, it is difficult to set a gamma value suitable for each image, and an original color can change when a wrong gamma value is set.

SUMMARY OF THE INVENTION

The present invention provides an image processing apparatus and method for enhancing contrast using intensity mapping.

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided an image processing apparatus including: a determination unit that determines whether contrast enhancement processing should be performed on an input image; an intensity mapping unit that generates a plurality of images having different exposure times from the input image, using intensity mapping, if the contrast enhancement processing should be performed on the input image; and an image composition unit that composes the plurality of images into an image.

According to another aspect of the present invention, there is provided an image processing method including: determining whether contrast enhancement processing should be performed on an input image; if the contrast enhancement processing should be performed on the input image, generating a plurality of images having different exposure times from the input image, using intensity mapping; and composing the plurality of images into an image.

According to another aspect of the present invention, there is provided an image encoding apparatus including: a determination unit that determines whether an image, on which contrast enhancement processing should be performed, exists among input moving images; an intensity mapping unit that generates a plurality of images having different exposure times from an image, on which the contrast enhancement processing should be performed, using intensity mapping; an image composing unit that composes the plurality of images into a composed image; an encoder that encodes the composed image together with remaining images not subjected to the contrast enhancement processing; and a lighting change information generating unit that generates lighting change information between the composed image and an original image.

According to another aspect of the present invention, there is provided an image encoding method including: determining whether an image, on which contrast enhancement processing should be performed, exists among input moving images; generating a plurality of images having different exposure times from an image, on which the contrast enhancement processing should be performed, using intensity mapping; composing the plurality of images into a composed image; encoding the composed image together with remaining images not subjected to the contrast enhancement processing; and generating lighting change information indicating brightness differences between the composed image and an original image.

According to another aspect of the present invention, there is provided an image encoding method including: determining whether an input moving image has a change in motion; determining whether contrast enhancement processing should be performed on an image having no change in motion; if the contrast enhancement processing should be performed on the image having no change in motion, composing the moving image in a unit of a predetermined frame; encoding the composed image; and generating lighting change information indicating brightness differences between the composed image and an original image.

According to another aspect of the present invention, there is provided an image decoding apparatus including: a decoding unit that receives an encoded image using intensity mapping and decodes the encoded image; and an image restoring unit that receives lighting change information indicating brightnesses differences between an image subjected to the intensity mapping and an original input image, and restores the decoded image to an original image, using the lighting change information.

According to another aspect of the present invention, there is provided an image decoding method including: receiving an image encoded using intensity mapping and lighting change information indicating brightness differences between the image subjected to the intensity mapping and an original input image; decoding the decoded image; and restoring the decoded image to an original image, using the lighting change information.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference to the appended drawings.

Figure 1:
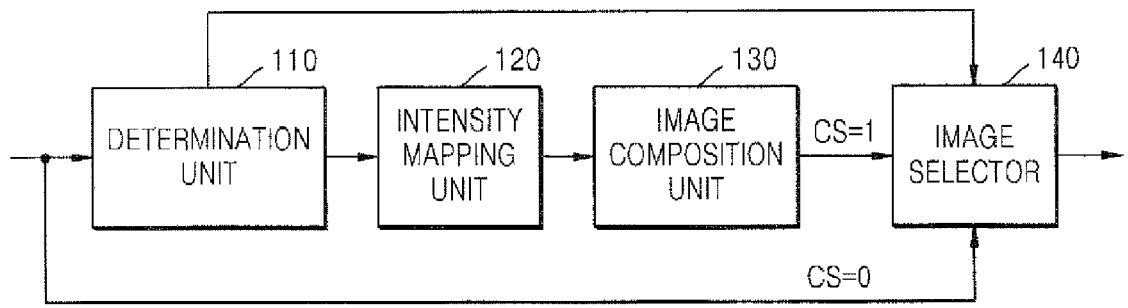
FIG. 1 is a block diagram of an image processing apparatus according to an exemplary embodiment of the present invention.

FIG. 1 is a block diagram of an image processing apparatus according to an exemplary embodiment of the present invention. Referring to FIG. 1, the image processing apparatus includes a determination unit 110, an intensity mapping unit 120, an image composition unit 130, and an image selector 140.

The determination unit 110 determines whether contrast enhancement processing should be performed on an input image. The determination unit 110 determines whether to perform contrast enhancement processing, according to whether an average brightness value of an input image is within a predetermined brightness range.

Figure 2:
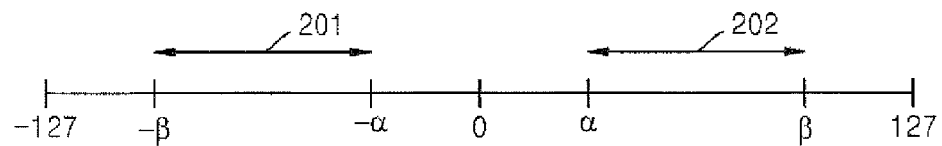
FIG. 2 illustrates a brightness range of an input image that is to be subjected to contrast enhancement processing.

FIG. 2 illustrates a brightness range of an input image that is to be subjected to contrast enhancement processing. Referring to FIG. 2, if an average brightness of an input image is M, it is determined whether M is within a range of $\alpha<|M-127|<\beta$ (201, 202). The brightness, that is, an intensity, is represented by a value between 0 and 255. If $0<|M-127|<\alpha$, it is determined that the corresponding image has a good contrast, and accordingly, the image does not need to be subjected to contrast enhancement processing. Meanwhile, if $\beta<|M-127|<127$, it is determined that the input image is too bright or too dark. In this case, contrast enhancement processing does not greatly influence the image.

Accordingly, when an average brightness value M of an input image is within a range of $\alpha<|M-127|<\beta$ (201, 202), the determination unit 110 determines that contrast enhancement processing should be performed on the input image. A process for obtaining the average brightness value M of the input image will be described later with reference to FIGS. 3 and 4.

If it is determined that contrast enhancement processing should be performed on an image, the intensity mapping unit 120 generates a plurality of images using the input image by intensity mapping, wherein the plurality of images have different exposure times.

Then, the intensity mapping unit 120 performs intensity mapping on the input image, generates a first image with an intensity different from that of the input image, receives the first image, performs intensity mapping on the first image, and generates a second image with an intensity different from that of the first image. In this manner, the intensity mapping unit 120 can generate the plurality of images having different exposure times using the input image. In order to perform intensity mapping, an intensity mapping function representing an intensity relationship between two images having different exposure times is needed.

The intensity mapping unit 120 can perform intensity mapping with respect to the input image, using an intensity mapping function which is satisfied when a camera response function and a ratio of exposure times of two images are represented as a gamma function. The intensity mapping unit 120 decides the intensity mapping function, using two images having different exposure times, and then, generates images having different intensities using the decided intensity mapping function.

The intensity mapping unit 120 performs contrast enhancement processing, and generates an input image as a plurality of images, using an intensity mapping function, if the input image belongs to a dark image range. Meanwhile, if the input image belongs to a bright image range, the intensity mapping unit 120 generates the input image as a plurality of images using an inverse function of the intensity mapping function. A principle in which the intensity mapping unit 120 performs intensity mapping and generates a plurality of images having different exposure times will be described later in detail with reference to FIGS. 5A and 5B.

The image composition unit 130 composes the plurality of images generated by the intensity mapping into an image. The image composition unit 130 can compose an image by averaging pixel values positioned at the same pixel location in the plurality of images, or the image composition unit 130 can generate an image pattern using the plurality of images and calculate an average of pixel values for a predetermined number of pixels included in the image pattern, thereby composing an image. As such, by composing a plurality of images having different exposure times using intensity mapping, an image with an enhanced contrast is generated.

The image selector 140 selects an original input image or a composed image subjected to contrast enhancement processing, according to information CS indicating whether to perform contrast enhancement processing on the input image received from the determination unit 110. If the information CS indicates that contrast enhancement processing should be performed on the input image (for example, if CS=1), the image selector 140 selects a composed image subjected to contrast enhancement processing. If the information CS indicates that contrast enhancement processing does not need to be performed on the input image (for example, if CS=0), the image selector 140 selects and outputs the input image.

Figures 3, 4:
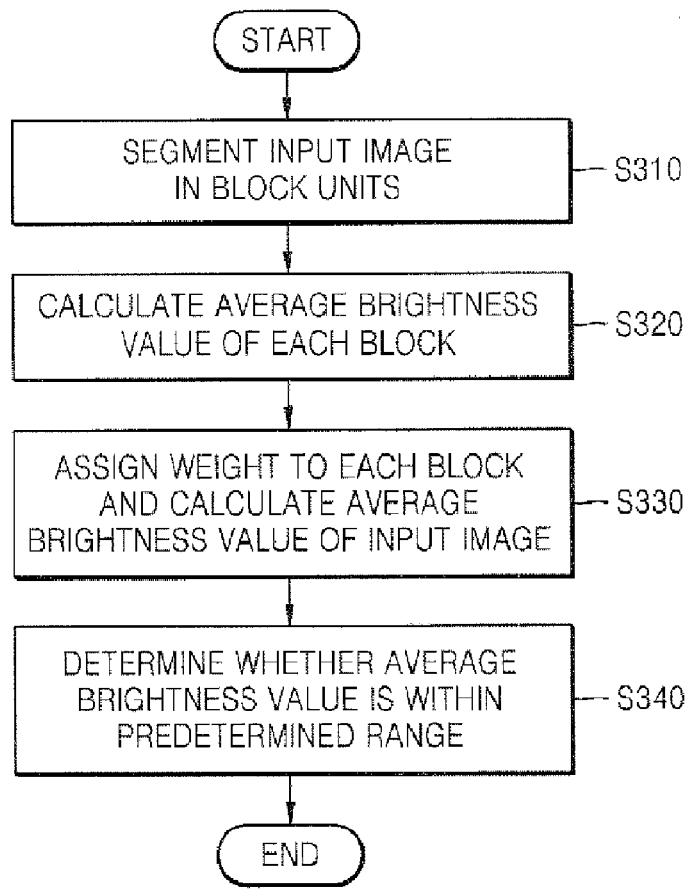
FIG. 3 is a flowchart illustrating a process of determining whether contrast enhancement processing should be performed on an image, using an image processing method according to an exemplary embodiment of the present invention.
FIG. 4 illustrates an input image segmented into a predetermined number of blocks.

FIG. 3 is a flowchart illustrating a process of determining whether an image should be subjected to contrast enhancement processing, using an image processing method according to an exemplary embodiment of the present invention. FIG. 4 illustrates an input image segmented into a predetermined number of blocks.

In order to determine whether an input image should be subjected to contrast enhancement processing, brightness determination is performed as preprocessing. The determination unit 110 calculates an average brightness value of an input image, determines whether the average brightness value is within a predetermined range, and determines that contrast enhancement processing should be performed if the average brightness value is within the predetermined range.

In this case, the determination unit 110 calculates simply an average brightness value of an input image, determines whether the average brightness value is within a predetermined brightness range in which contrast enhancement is effective, and then determines whether contrast enhancement processing should be performed on the image. However, the average brightness value of the image is calculated while considering a contrast of a main object of the image.

When calculating the average brightness value of the input image, the determination unit 110 segments the input image into a plurality of blocks, calculates an average brightness value of the input image by assigning a weight to the average brightness value of each block. Referring to FIG. 3, in operation S310, the determination unit 110 segments an input image into a plurality of blocks. For example, an input image can be segmented in a unit of 5×5 blocks.

Then, in operation 320, an average brightness value (that is, an average pixel value) of each block is calculated. In operation S330, the determination unit 110 assigns a weight to the average pixel value of each block and then, calculates an average brightness value of the input image. Since the center part of the input image has a high probability that a main object exists, a weight greater than that assigned to the edge part of the input image is assigned to the center part of the input image.

Referring to FIG. 4, a greatest weight value is assigned to an average pixel value of a block A1, and smaller weights than that assigned to the block A1 are assigned to average pixel values of 8 blocks B1 through B8 surrounding the block A1. No weight is assigned to average pixel values of the remaining blocks C1 through C16. In this case, the sum of all the weights is 1. Accordingly, by summing values obtained by multiplying the weights by average original brightness values of respective blocks in the input image, and segmenting the summed value by the total number of blocks, an average brightness value of the image can be calculated while considering the location of an object.

In operation S340, it is determined whether the average brightness value of the image is within a predetermined brightness range. If the average brightness value of the image is within the predetermined brightness range, since the image requires contrast enhancement or is an image in which contrast enhancement is effective, it is determined that the image should be subjected to contrast enhancement processing.

Figure 5A:
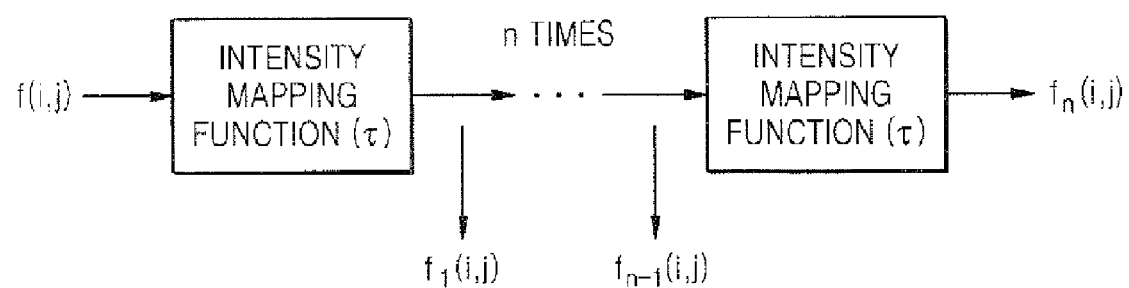
FIGS. 5A and 5B are views for explaining a process of segmenting an input image into a plurality of images having different exposure times, according to an exemplary embodiment of the present invention.
Figure 5B:
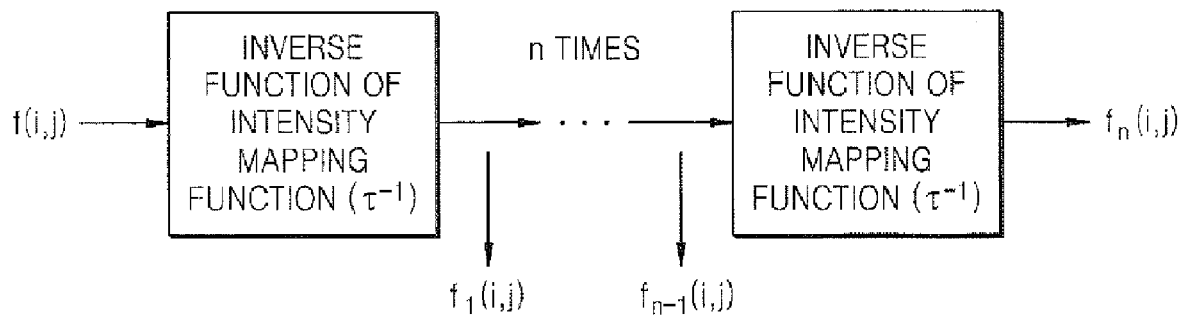

FIGS. 5A and 5B are views for explaining a process of generating a plurality of images having different exposure times from an input image, according to an exemplary embodiment of the present invention.

In order to generate a plurality of images having different exposure times, if it is assumed that a camera response function which represents a relationship between intensity and radiance approximates a gamma function, an intensity relationship between images having a constant exposure time can be represented by a graph having a constant slope.

When a certain scene is photographed by a camera, the photographed image will have a constant irradiance if no change in light occurs. However, by adjusting an exposure time of the camera, the amount of light received by the camera varies. That is, a case where a scene is photographed during an exposure time of 2t will have an amount of light twice that of a case where the scene is photographed during an exposure time of t. When this is represented as an equation, if irradiance is E and an exposure time is t, a total amount of light becomes E*t.

When an image is photographed so that a ratio $T_2/T_1$ of exposure times $T_1$ and $T_2$ has a form of $2^Y$, it is assumed that irradiance obtained from the camera is $E_1$ and $E_2$. In this case, $E_1=E*T_1$ and $E_2=E*T_2$. Accordingly, $E_1/T_1=E_2/T_2$.

Under the same conditions, if an image is photographed using a camera having a camera response function f, intensity $I_1=f(E_1)$ when an exposure time is $T_1$, and intensity $I_2=f(E_2)$ when an exposure time is $T_2$. Here, irradiance satisfies $E_1=f^{-1}(I_1)$ and $E_1/T_1=E_2/T_2$ is satisfied. Therefore, if $k=T_2/T_1$, $E_2=kE_1$.

Accordingly, $I_2=f(E_2)=f(k*E_1)=f(k*\text{inv } f(I_1))$. A relationship of an intensity and irradiance including an exposure time, that is, the camera response function can be represented by a gamma function.

That is, if $f(I)=I^{-Y}$, an inverse function of the camera response function becomes $f^{-1}(I)=I^Y$. Accordingly, $I_2=\tau(I)=f(k*\text{inv } f(I_1))=f(2^Y(I^Y))=((2^Y)(I^Y))^{-Y}=2I$. Thus, an intensity mapping function $\tau(I)=2I$. Images having different exposure times can be generated using the intensity mapping function $\tau(I)$ which represents a relationship between $I_1$ and $I_2$ derived as described above.

Referring to FIG. 5A, an input image can be represented by f(i, j), wherein i and j are variables indicating the location of each pixel of the image. If the input image f(i, j) is mapped to the intensity mapping function, an image $f_1(i, j)$, which is brighter than the input image f(i, j), is outputted. Then, if the image $f_1(I, j)$ is mapped to the intensity mapping function, an image $f_2(i, j)$, which is brighter than the image f1(i, j), is outputted. In this manner, by performing intensity mapping on an input image requiring performance improvement, a plurality of images having different exposure times can be generated.

The intensity mapping function as described above is used to improve the contrast of a dark image with low contrast. That is, in FIG. 2, the intensity mapping function can be applied to images having a brightness range of $-\beta<M-127<-\alpha$.

Meanwhile, in the case where an input image is bright, that is, in the case where an input image has a high intensity, as illustrated in FIG. 5B, a plurality of images having an intensity lower than that of the input image can be generated by using an inverse function of the intensity mapping function. In the case when the input image has a brightness range of $\alpha$<M−127<$\beta$, it is possible to generate a plurality of images having different intensities using the inverse function of the intensity mapping function and to compose the generated images into an image, thereby generating an image having improved contrast.

Figure 6A:
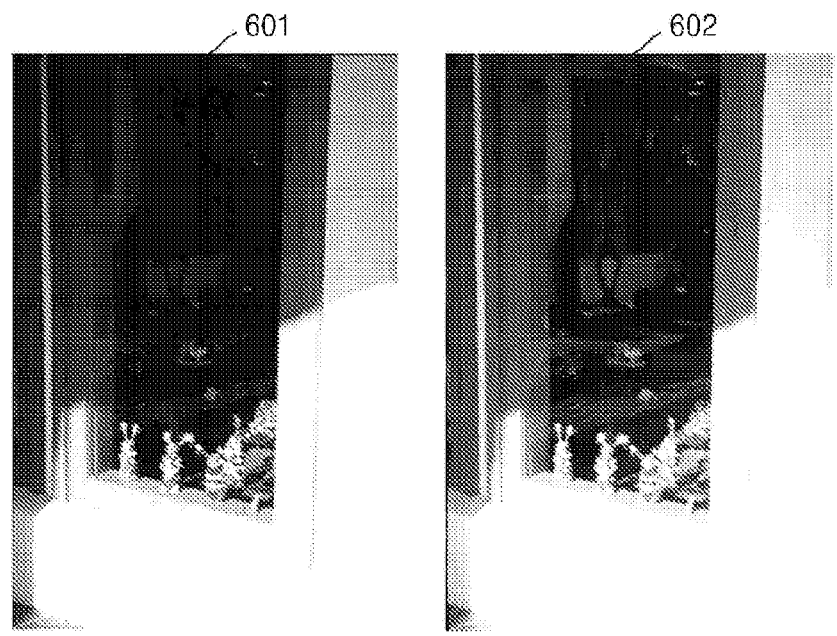
FIG. 6A illustrates two images having different exposure times.
Figure 6B:
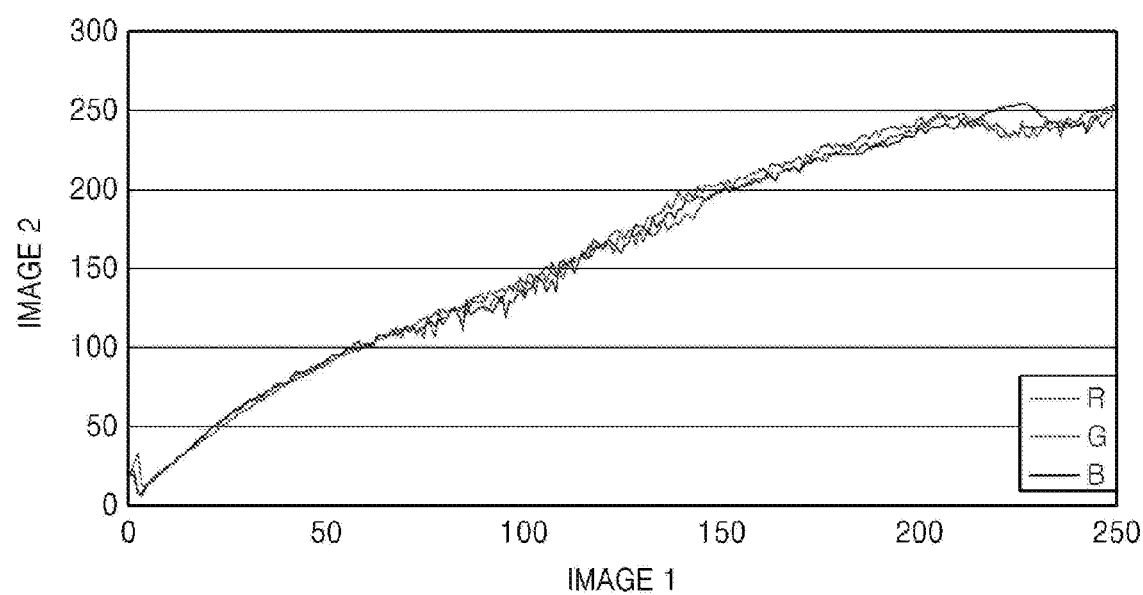
FIG. 6B is a graph plotting an intensity mapping function generated from the two images illustrated in FIG. 6A.

FIG. 6A illustrates two images having different exposure times, and FIG. 6B is a graph plotting an intensity mapping function generated from the two images illustrated in FIG. 6A.

In order to create various images having different exposure times, another method of obtaining an intensity mapping function will now be described.

Due to different characteristics of cameras, and different noise characteristics or different characteristics of camera sensors when photographing images, etc., an actual intensity mapping function may not have a constant slope, and may differ from the intensity mapping function $\tau(I)=2I$.

Accordingly, in order to obtain an image similar to an actual image, an intensity mapping function, which represents a relationship between intensities of two images photographed at different exposure times, can be created and used. The intensity mapping function can be derived using various methods.

If the two images photographed at different exposure times are respectively a first image 601 and a second image 602, a graph which represents an intensity relationship between the first image 601 and the second image 602 can be created, as illustrated in FIG. 6B, using pixel values at the locations of pixels of the first image 601 and pixel values of pixels corresponding to the respective pixel locations of the first image 601 in the second image 602. By using the graph as an intensity mapping function, it is possible to generate an image as a plurality of images having different intensities.

Figure 7A:
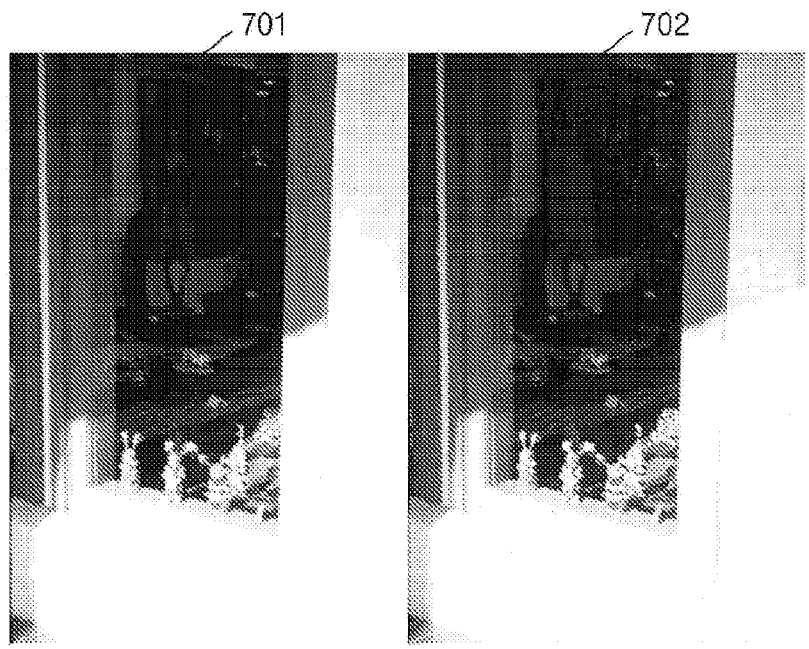
FIGS. 7A and 7B illustrate images that were actually photographed at different exposure times, and images that are generated using the intensity mapping function according to an exemplary embodiment of the present invention as if they were photographed at different exposure times.
Figure 7B:
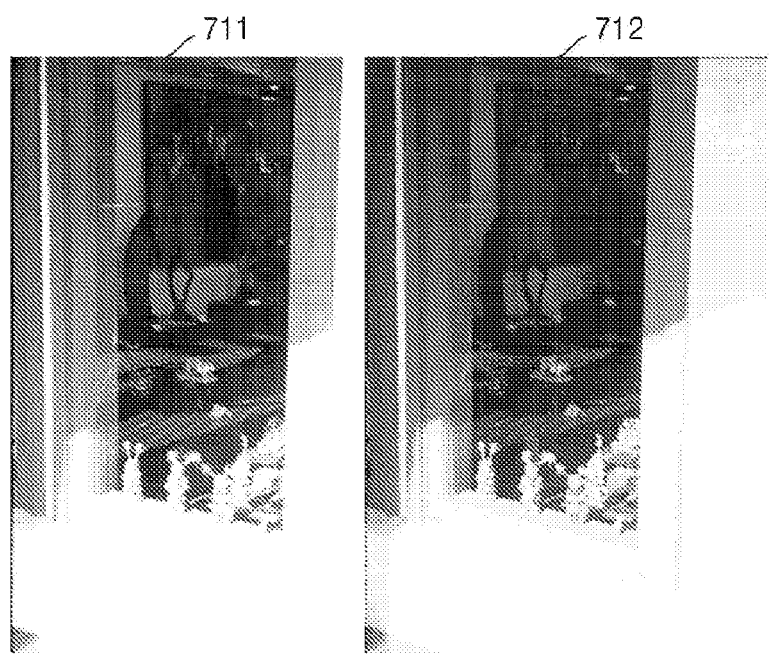

FIGS. 7A and 7B illustrate both images that were actually photographed at different exposure times and images that are generated using the intensity mapping function according to an exemplary embodiment of the present invention. The intensity mapping function provides images that appear as if they were photographed at different exposure times.

FIG. 7A illustrates an image 701 actually photographed at a double exposure time and an image 702 generated using an intensity mapping function as if it was photographed at a double exposure time. FIG. 7B illustrates an image 711 actually photographed at a quadruple exposure time and an image 712 generated using an intensity mapping function as if it was photographed at a quadruple exposure time. As illustrated in FIGS. 7A and 7B, the images generated using the intensity mapping function according to the exemplary embodiment of present invention are very similar to images actually photographed at different exposure times.

Figure 8A:
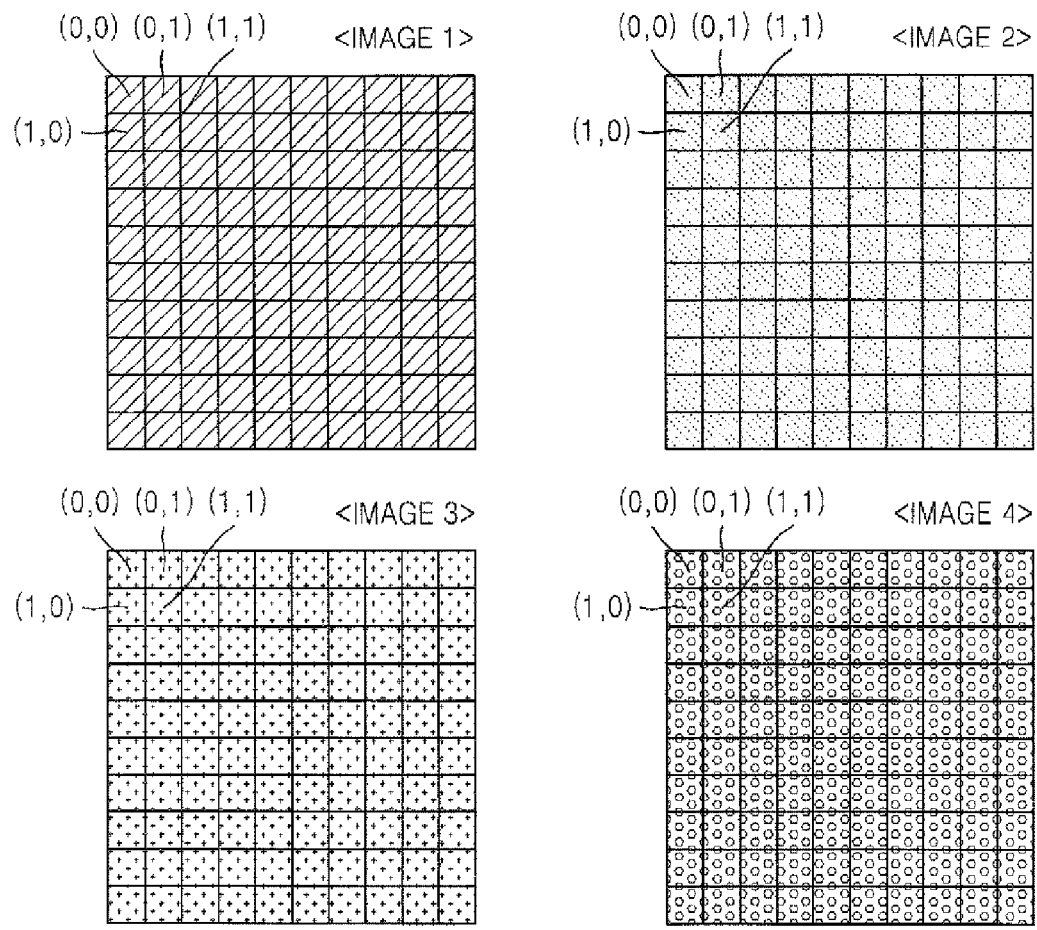
FIGS. 8A and 8B are views for explaining an image composition method according to an exemplary embodiment of the present invention.
Figure 8B:
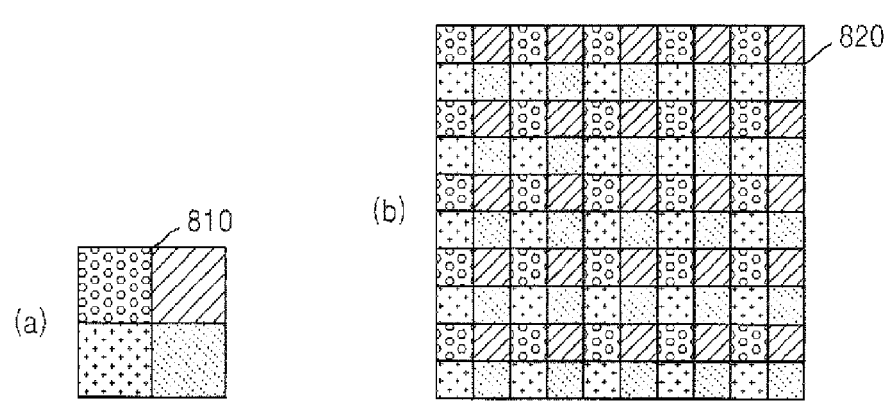

FIGS. 8A and 8B are views for explaining an image composition method according to an exemplary embodiment of the present invention.

In FIGS. 8A and 8B, an image 1, an image 2, an image 3, and an image 4 have different exposure times. It is assumed that the images become darker in the order of image 1, image 2, image 3, and image 4.

Referring to FIG. 8A, when the location of each pixel is represented by a two-dimensional coordinate, by averaging a pixel value of a pixel location (0, 0) of the image 1, a pixel value of a pixel location (0, 0) of the image 2, a pixel value of a pixel location (0, 0) of the image 3, and a pixel value of a pixel location (0, 0) of the image 4, an average pixel value of the pixel location (0, 0) can be derived as a pixel value of a pixel location (0, 0) of a composed image. In this manner, by averaging the pixel values of the locations of respective corresponding pixels, an image can be composed.

As another method, as illustrated in FIG. 8B, a pattern, such as a pattern 810, consisting of four pixels can be generated using four images having different brightnesses. By extending the pattern, an entire image, such as an image pattern 820, in which four pixel patterns are repeated, can be generated. It is assumed that the image pattern 820 has coordinate values as illustrated in FIG. 8A. In this case, by averaging pixel values of (0, 0), (0, 1), (1, 0), and (1, 1), a pixel value of a pixel at a location (0, 0) is derived. By averaging pixel values of (0, 1), (0, 2), (1, 1), and (1, 2), a pixel value of a pixel at a location (0, 1) is decided. In this manner, an image can be composed by using the four images.

Figure 9:
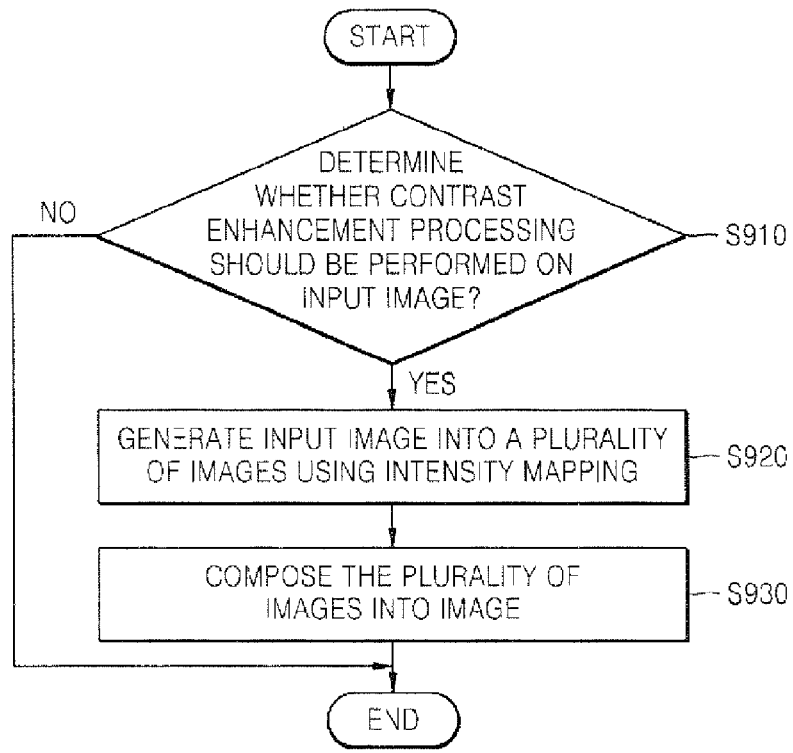
FIG. 9 is a flowchart illustrating an image processing method according to an exemplary embodiment of the present invention.

FIG. 9 is a flowchart illustrating an image processing method according to an exemplary embodiment of the present invention.

Referring to FIG. 9, in operation S910, it is determined whether contrast enhancement processing should be performed on an input image. The determination is performed because input images having good contrast do not need to be subjected to contrast enhancement processing and images that are too dark are not influenced by contrast enhancement processing.

If it is determined that an input image should be subjected to contrast enhancement processing, the input image is generated as a plurality of images using intensity mapping, in operation S920. In this case, the plurality of images have different exposure times.

Then, in operation S930, the plurality of images are composed into an image.

Meanwhile, the contrast enhancement processing according to an exemplary embodiment of the present invention can be applied to moving images. If a moving image sequence having a low contrast is input, in order to enhance a contrast of the moving image, it is necessary to input the moving image sequence to the image processing apparatus illustrated in FIG. 1. That is, by generating each image as a plurality of images having different intensities respectively and then composing the plurality of images into an image respectively, contrast can be enhanced. In order to apply the contrast enhancement method according to an exemplary embodiment of the present invention to an apparatus such as a television, the intensity mapping function can be applied to various color image types. That is, the intensity mapping function can be applied to color images having a format of R, G, and B, color images having a format of Y, Cb, and Cr, and color images having a format of Y, I, and Q.

Figure 10:
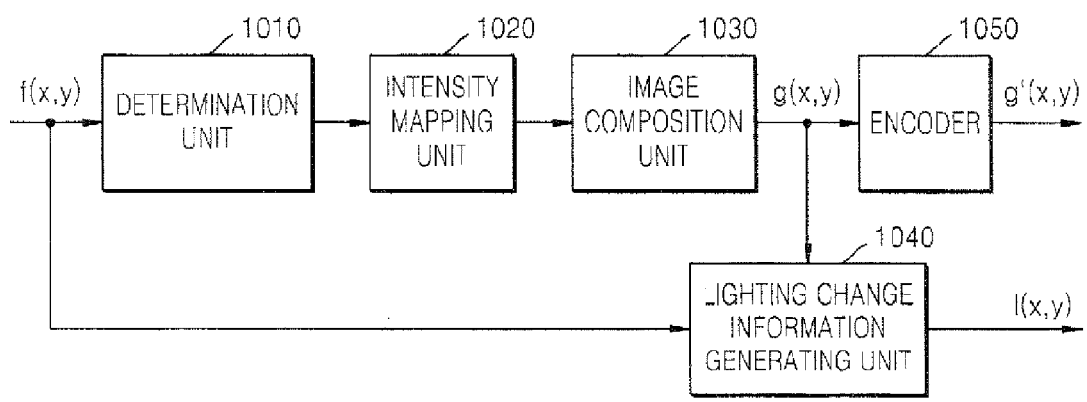
FIG. 10 is a block diagram of a moving image encoding apparatus using contrast enhancement processing, according to an exemplary embodiment of the present invention.

FIG. 10 is a block diagram of a moving image encoding apparatus using contrast enhancement processing, according to an exemplary embodiment of the present invention. Referring to FIG. 10, the moving image encoding apparatus includes a determination unit 1010, an intensity mapping unit 1020, an image composition unit 1030, a lighting change information generating unit 1040, and an encoder 1050.

When a moving image is encoded, if the moving image has a change in lighting (for example, if an image frame having low contrast is included in a moving image sequence), correct motion estimation is impossible. If an error is found during motion estimation, when an encoded image having the error is decoded, the image cannot be correctly restored. Accordingly, by encoding a moving image having low contrast after performing contrast enhancement processing on the moving image, correct motion estimation is possible.

This is achieved by the determination unit 1010 determining whether an image, on which contrast enhancement processing should be performed, exists among input moving images f(x, y). The determination unit 1010 can determine whether an image, on which contrast enhancement processing should be performed, exists, in the same manner as that performed by the determination unit 110 of FIG. 1.

The intensity mapping unit 1020 generates an image, on which contrast enhancement processing should be performed, into a plurality of images, using intensity mapping. Here, the plurality of images, as described above, have different exposure times. The intensity mapping unit 1020 can perform the same operation as that performed by the intensity mapping unit 120 of FIG. 1.

The image composition unit 1030 composes the plurality of images into an image g(x, y). The encoder 1050 encodes the composed image g(x, y) together with the remaining moving image frames on which contrast enhancement processing does not need to be performed, thereby generating an encoded image g'(x, y).

Meanwhile, since the image subjected to contrast enhancement processing is different from an original image, difference information I(x, y) representing a difference in brightness between the original image and the image having an enhanced contrast is transferred to a decoding terminal. In this specification, the difference information I(x, y) is referred to as lighting change information.

The lighting change information generator 1040 generates lighting change information between the composed image and the original image. The lighting change information may be pixel value differences between the composed image in a block unit and the original image. The lighting change information, which represents pixel value differences, can be transmitted in a block unit. Or, the lighting change information can approximate pixel value differences according to several parameters and can be transmitted as parameter information.

Meanwhile, the determination unit 1010 can also determine whether an input moving image is an image having no change in motion. If an input moving image sequence requires contrast enhancement processing, but has no change in motion, since the input moving image sequence has a change in lighting, the moving image is similar to a plurality of images created using intensity mapping. Accordingly, the moving image can be composed as an image included in a moving image sequence, without intensity mapping.

Accordingly, if the determination unit 1010 determines that a moving image has no change in motion and does not require contrast enhancement processing, the moving composition unit 1030 does not receive the moving image via the intensity mapping processing unit 1020, but composes the moving image in a unit of a predetermined frame. Here, if the moving image frame having no change in motion is an image 1, an image 2, an image 3, through to an image n, it is possible to compose the moving image frame in a unit of two or three frames. Methods of composing a moving frame can vary. For example, it is possible to compose image 1 and image 2, and compose image 2 and image 3. Accordingly, composed images can be generated by the number of frames of input moving images. Also, the lighting change information, which is pixel value differences between the composed image in a block unit and the original image, can be generated by the number of composed images.

Figure 11:
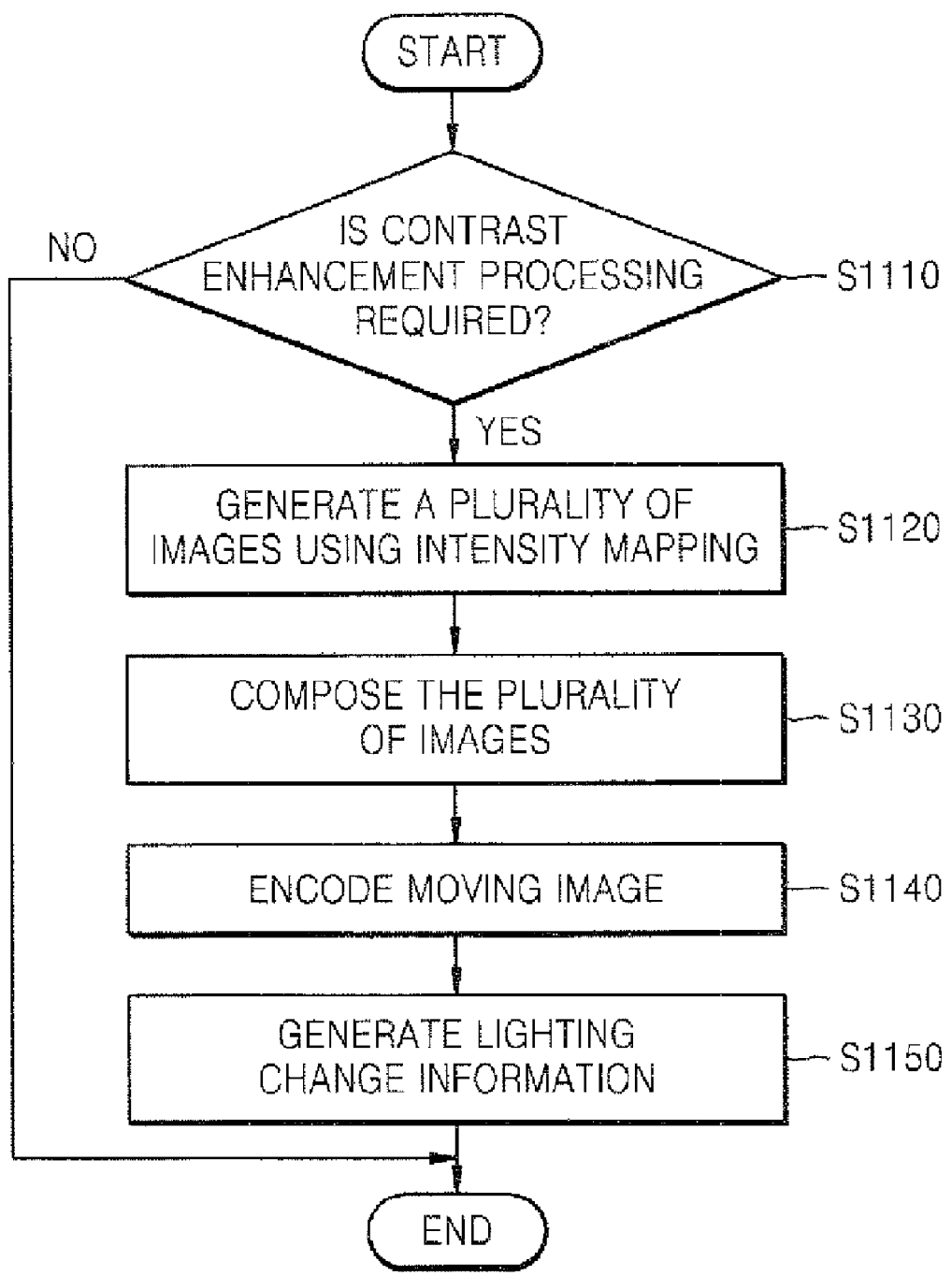
FIG. 11 is a flowchart illustrating a moving image encoding method using contrast enhancement processing, according to an exemplary embodiment of the present invention.

FIG. 11 is a flowchart illustrating a moving image encoding method using contrast enhancement processing, according to an exemplary embodiment of the present invention.

Referring to FIG. 11, in operation S1110, it is determined whether an image, on which contrast enhancement processing should be performed, exists among input moving images. Then, in operation S1120, if an image, on which contrast enhancement processing should be performed, exists among the input moving images, the image is respectively generated as a plurality of images, using intensity mapping. Here, the plurality of images have different exposure times.

Then, in operation S1130, the plurality of images are composed into an image. In operation S1140, the composed image is encoded together with the remaining moving image frames not subjected to contrast enhancement processing.

In operation S1150, lighting change information between the composed image and an original image is created. The lighting change information means pixel value differences in a block unit between the composed image and the original image. The encoded image and the lighting change information are transferred to a decoder.

Figure 12:
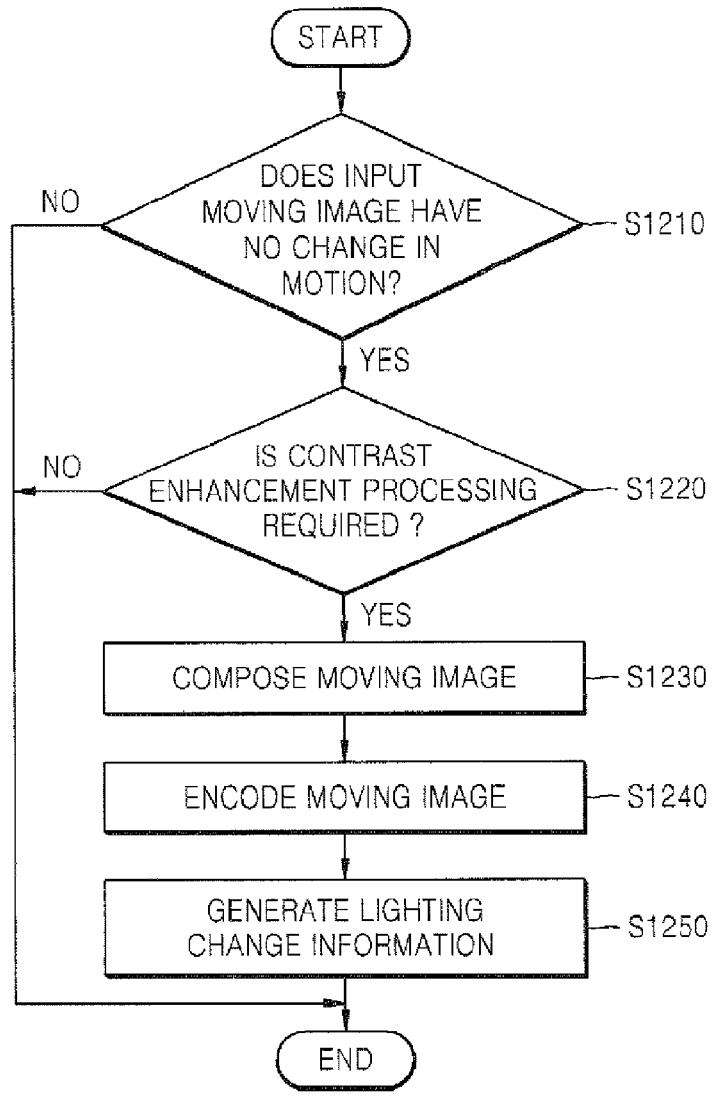
FIG. 12 is a flowchart illustrating a moving image encoding method using contrast enhancement processing, according to another exemplary embodiment of the present invention.

FIG. 12 is a flowchart illustrating a moving image encoding method using contrast enhancement processing, according to another exemplary embodiment of the present invention.

In operation S1210, it is determined whether an input moving image has a change in motion. In operation S1220, it is determined whether contrast enhancement processing should be performed on an image having no change in motion.

In operation S1230, if it is determined that contrast enhancement processing should be performed on the image having no change in motion, a moving image sequence frame having no change in motion is composed and a composed image is generated. In operation S1240, moving image encoding is performed using the composed image.

In operation S1250, lighting change information between the composed image and the original image is generated. The moving image encoding method, as described above, can be applied to a case where contrast enhancement processing is needed due to a lighting change in an input moving image sequence, but where no change in motion occurs.

Figure 13:
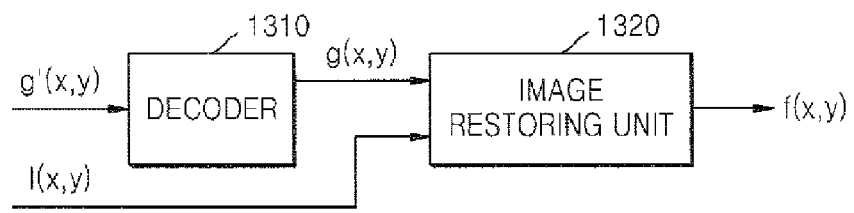
FIG. 13 is a block diagram of a moving image decoding apparatus for decoding an encoded moving image using contrast enhancement processing, according to an exemplary embodiment of the present invention.

FIG. 13 is a block diagram of a moving image decoding apparatus for decoding an encoded moving image using contrast enhancement processing, according to an exemplary embodiment of the present invention. The moving image decoding apparatus includes a decoder 1310 and an image restoring unit 1320.

The decoder 1310 receives an encoded image g'(x, y) using intensity mapping and decodes the encoded image g'(x, y). A decoded image g(x, y) is an image subjected to contrast enhancement processing by an encoder. Accordingly, the image restoring unit 1320 restores a decoded image using lighting change information.

That is, the image restoring unit 1320 receives lighting change information I(x, y), which is pixel value differences between the image subjected to contrast enhancement processing using intensity mapping performed in a block unit between a composed image and the original image and its original image. Then, the image restoring unit 1320 restores the decoded image g(x, y) to the original image f(x, y) using the lighting change information I(x, y).

Figure 14:
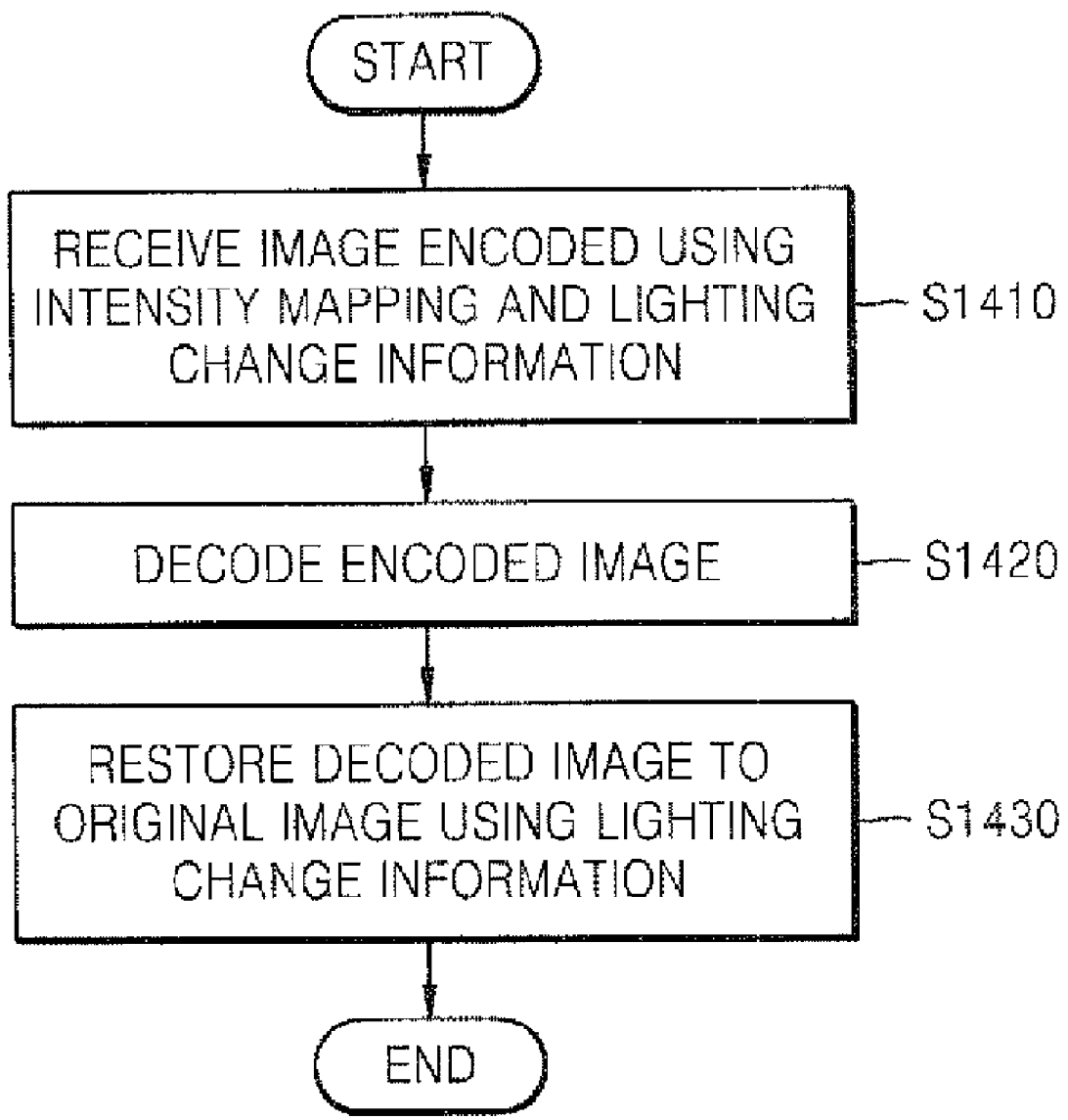
FIG. 14 is a flowchart illustrating a moving image decoding method according to an exemplary embodiment of the present invention.

FIG. 14 is a flowchart illustrating a moving image decoding method according to an exemplary embodiment of the present invention.

Referring to FIG. 14, in operation S1410, an image encoded using intensity mapping and lighting change information is received. The lighting change information represents differences in brightness between an image subjected to intensity mapping and its original image. Then, in operation S1420, the encoded image is decoded. In operation S1430, the decoded image is restored to an original image using the lighting change information.

Figure 15A:
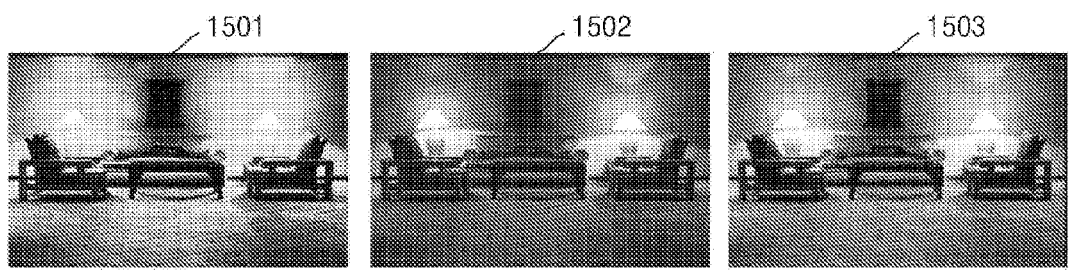
FIGS. 15A and 15B illustrate images subjected to contrast enhancement processing according to an exemplary embodiment of the present invention, and images subjected to contrast enhancement processing according to the related art.
Figure 15B:
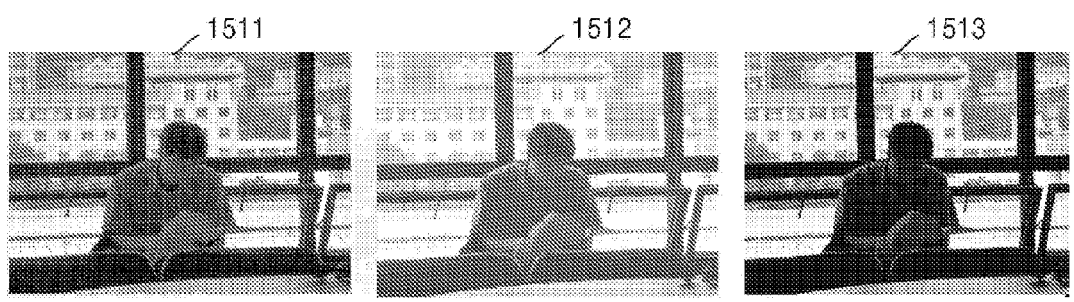

FIGS. 15A and 15B illustrate images subjected to contrast enhancement processing according to an exemplary embodiment of the present invention, and images subjected to contrast enhancement processing according to the related art.

In FIG. 15A, an image 1501 is an image on which contrast enhancement processing is performed using a histogram smoothing method, and an image 1502 is an image on which contrast enhancement processing is performed using a gamma correction method. The image 1503 is an image on which contrast enhancement processing is performed using intensity mapping according to an exemplary embodiment of the present invention.

In FIG. 15B, an image 1511 is an image on which contrast enhancement processing is performed using the histogram smoothing method, an image 1512 is an image on which contrast enhancement processing is performed using the gamma correction method, and an image 1513 is an image on which contrast enhancement processing is performed using intensity mapping according to an exemplary embodiment of the present invention.

As illustrated in FIGS. 15A and 15B, the image 1503 and the image 1513 have less change in color and a reduced false contour phenomenon and the direction and effect of lighting are definite, compared to images 1501, 1502, 1511, and 1512 processed according to the related art method.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the exemplary embodiments of the present invention, there is provided an image processing apparatus and method, which are capable of reducing a change in color and a false contour phenomenon during a contrast enhancement process.

Also, in the image encoding method and apparatus according to the exemplary embodiments of the present invention, by applying a contrast enhancement processing method according to the present invention to a moving image in order to correctly estimate a motion in an image sequence having a change in lighting, it is possible to efficiently perform encoding of the moving image.

Also, according to the exemplary embodiments of the present invention, there is provided an image decoding apparatus and method for decoding an encoded moving image using an image processing method of enhancing contrast using intensity mapping.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image processing apparatus comprising:
a determination unit that determines whether contrast enhancement processing should be performed on an input image;
an intensity mapping unit that generates a plurality of images having different exposure times from the input image, using intensity mapping, if the contrast enhancement processing should be performed on the input image; and
an image composition unit comprising a processor for composing the plurality of images into an image, if the contrast enhancement processing should be performed on the input image,
wherein the determination unit segments the input image in block units, assigns a weight to each block according to the location of each block, and calculates an average brightness value of the input 2. The image processing apparatus of claim 1, wherein the determination unit determines whether the contrast enhancement processing should be performed on the input image according to whether an average brightness value of the input image is within a predetermined range.

3. The image processing apparatus of claim 1, wherein the determination unit assigns a weight to a center part of the input image that is greater than a weight assigned to an edge part of the input image.

4. The image processing apparatus of claim 1, wherein the intensity mapping unit performs intensity mapping on the input image, using an intensity mapping function which is satisfied when a camera response function and a ratio between exposure times of two images are expressed by a gamma function.

5. The image processing apparatus of claim 1, wherein the intensity mapping unit derives an intensity mapping function, using two images having different exposure times.

6. The image processing apparatus of claim 1, wherein, if an input image, on which the contrast enhancement processing should be performed, is within a dark image range, the intensity mapping unit generates the input image as a plurality of images using an intensity mapping function, and
if the input image is within a bright image range, the intensity mapping unit generates the input image as a plurality of images, using an inverse function of the intensity mapping function.

7. The image processing apparatus of claim 1, wherein the image composition unit averages pixel values positioned at a same pixel location in the plurality of images, respectively, and composes the image.

8. The image processing apparatus of claim 1, wherein the image composition unit generates an image pattern using the plurality of images, calculates an average of pixel values for a predetermined number of pixels included in the image pattern, and composes the image.

9. The image processing apparatus of claim 1, further comprising an image selecting unit that receives information indicating whether contrast enhancement processing should be performed on the input image received from the determination unit, selects the composed image if the information indicates that the contrast enhancement processing should be performed on the input image, and selects the input image if the information indicates that the contrast enhancement processing does not need to be performed on the input image.

10. An image processing method comprising:
- determining whether contrast enhancement processing should be performed on an input image;
- if the contrast enhancement processing should be performed on the input image, generating a plurality of images having different exposure times from the input image, using intensity mapping; and
- if the contrast enhancement processing should be performed on the input image, composing the plurality of images into an image,
- the determination of whether the contrast enhancement processing should be performed on the input image comprises segmenting the input image into block units, assigning a weight to each block according to a location of the block and calculating an average brightness value of the input image.

11. The image processing method of claim 10, wherein the determination of whether the contrast enhancement processing should be performed on the input image comprises:
- if the average brightness value of the input image is within a predetermined range, determining that the contrast enhancement processing should be performed on the input image.

12. The image processing method of claim 10, wherein a weight assigned to a center part of the input image is greater than a weight assigned to an edge part of the input image.

13. The image processing method of claim 10, wherein the generating the plurality of images from the input image using the intensity mapping, comprises:
- generating a first image having an intensity different from the input image, using the intensity mapping; and
- generating a second image having an intensity different from the first image, using the intensity mapping.

14. The image processing method of claim 10, wherein in the generating of the input image as the plurality of images, using the intensity mapping, the intensity mapping is performed on the input image, using an intensity mapping function which is satisfied when a camera response function and a ratio between exposure times of two images are expressed by a gamma function.

15. The image processing method of claim 10, wherein the generating the input image as the plurality of images using the intensity mapping further comprises deriving an intensity mapping function using two images having different exposure times.

16. The image processing method of claim 10, wherein, in the generating the plurality of images using the intensity mapping,
- when the contrast enhancement processing should be performed on the input image, if the input image is within a dark image range, a plurality of images are generated using an intensity mapping function, and if the input image is within a bright image range, the plurality of images are generated using an inverse function of the intensity mapping function.

17. The image processing method of claim 10, wherein the composing the plurality of images into the image comprises averaging pixel values positioned at a same pixel location in the plurality of images, respectively, and composing the image.

18. The image processing method of claim 10, wherein the composing of the plurality of images into the image comprises:
- generating an image pattern using the plurality of images; and
- calculating an average of pixel values for a predetermined number of pixels included in the image pattern and composing the image.

19. The image processing method of claim 10, wherein the input image is a still image or a moving image.

20. A non-transitory computer-readable recording medium having embodied thereon a computer program for executing the method of claim 10.

* * * * *